3,211,688
POLYVINYL ACETATE PLASTICIZED WITH POLYESTER
Wilmer C. Eisenhard, Belleville, and Roderick B. Judge, Montclair, N.J., assignors to Wallace & Tiernan Inc., Belleville, N.J., a corporation of Delaware
No Drawing. Filed Apr. 20, 1961, Ser. No. 104,230
2 Claims. (Cl. 260—31.4)

This invention relates to polyesters. More particularly, this invention relates to relatively low molecular weight polyesters useful as plasticizers for synthetic resins, such as polyvinyl acetate, cellulose acetate, nitrocellulose and the like. Still more particularly, this invention relates to a method of preparing improved polymeric plasticizers and to compositions containing the same. Still more particularly, this invention relates to polyvinyl ester resin systems having improved properties, especially with respect to adhesion, and containing as a component thereof relatively low molecular weight polyesters prepared in accordance with this invention.

It is well known that for many industrial applications synthetic plastics or resins, such as polyvinyl acetate, polyvinyl chloride and the like require admixture or association with a plasticizer so as to impart thereto desirable physical properties, such as flexibility and satisfactory low temperature properties. More specifically, in the use of polyvinyl ester resin systems as adhesives there are certain generally recognized requirements necessary for optimum performance. These requirements are usually met by incorporating in the resin system a plasticizer compatible therewith to form a homogeneous system with the resin therein. Materials which have been employed as plasticizers for resins, such as polyvinyl ester resins, have included polymeric plasticizers prepared by reacting (esterification) diethylene glycol and adipic acid or by reacting phthalic anhydride, triethylene glycol and benzoic acid. Other materials, non-polymeric (monomers), which have been employed as plasticizers include dibutyl phthalate, dioctyl phthalate, tricresyl phosphate, diethylene glycol dibenzoate, butyl phthalyl butyl glycolate, butyl benzyl phthalate and chlorinated biphenyls.

Plasticizers are incorporated or otherwise admixed with a synthetic resin in any suitable amount effective to achieve the physical properties desired in the plasticizer-resin system of concern. Usually, the plasticizer is present in a minor amount by weight relative to the resin associated therewith or in the overall finished plasticizer-containing composition which might include other additive material such as filling agents, color agents, oxidation inhibitors and various other modifying or stabilizing agents. Also, the plasticizer-containing composition may contain a major amount of plasticizer therein, based on the total finished composition or considered only on the basis of plasticizer and resin content.

Usually plasticizers are incorporated or otherwise homogeneously admixed with resins, such as polyvinyl resins, e.g., polyvinyl acetate resins, in amounts in the range from about 10 to about 60% by weight based on the resin. The polyester resin-plasticizer combinations of this invention, as indicated hereinabove, may also contain blended or otherwise homogeneous admixed therewith minor amounts of pigments, extenders, insolubilizers and other modifiers.

The polyester resin plasticizer combinations of this invention are particularly useful for the manufacture of adhesives for use on paper, cellophane cloth, wood, ceramics and many other solid materials. In this connection for best use an adhesive resin-plasticizer combination should possess (1) speed of adhesion (2) specific adhesion (3) permanency or lack of migration and (4) viscosity stability of the resin-plasticizer combination on aging.

It is an object of this invention to provide new and useful polymeric compounds such as polyesters.

Another object of this invention is to provide new and useful resin-plasticizer combinations, particularly suitable for use as adhesives or in adhesive compositions.

Another object of this invention is to provide a method for the preparation of new and useful relatively low molecular weight polyesters particularly suitable for use as plasticizers when associated with resins, such as polyvinyl acetate resins.

Yet another object of this invention is to provide new and useful polyvinyl acetate resin composition useful as adhesives and the like.

Still another object of this invention is to provide new and useful low molecular weight linear polyesters useful as plasticizers for polymeric materials such as cellulose acetate, polyvinyl acetate, nitrocellulose and the like.

In accordance with this invention compounds having the formula:

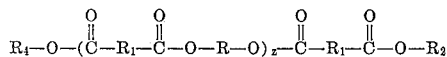

wherein R is a radical selected from the group consisting of alkylene radicals containing from 2 to 4 carbon atoms and polyoxyethylene radicals having the formula:

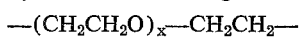

wherein $x$ is an integer selected from the group consisting of 1 and 2, $R_1$ is a radical selected from the group consisting of alkylene radicals containing from 4 to 8 carbon atoms and a radical having the formula:

$R_2$ is a radical selected from the group consisting of a hydrogen radical and a radical selected from the group having the formulas:

wherein $R_3$ is an aliphatic hydrocarbon radical containing from 1 to 4 carbon atoms, $R_4$ is a radical selected from the group consisting of HO—R— wherein R is as aforesaid and radicals having the formulas:

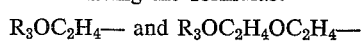

wherein $R_3$ is as aforesaid and $z$ is an integer having a value in the range 5–10 inclusive when $R_2$ is a hydrogen radical and $R_4$ is HO—R— and an integer having a value in the range 1–5 inclusive when $R_2$ is a radical selected from the group consisting of radicals having the formulas:

and $R_4$ aforesaid is other than HO—R—, have been prepared and have been found to be particularly useful as plasticizers for synthetic polymeric materials, such as cellulose acetate, nitrocellulose and the like and particularly polyvinyl acetate resin in adhesive compositions.

The polymeric plasticizers of this invention, described hereinabove, have been found to exhibit excellent compatibility with synthetic resins, particularly with polyester resins and contribute in a unique manner to the adhesive properties of these resins and compositions containing the same. The polymeric compounds, polyesters, of this invention are prepared from (1) a dicarboxylic acid containing an ether linkage, specifically, diglycolic acid, a compound having the structural formula:

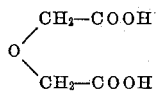

alone or in combination with a major or minor amount of an alkylene dicarboxylic acid, such as an aliphatic dicarboxylic acid containing from 6 to 10 carbon atoms per molecule, e.g., adipic acid, pimelic acid, suberic acid, azelaic acid, sebacic acid, (2) an aliphatic glycol or a polyethylene glycol containing an ether linkage or ether linkages, such as propylene glycol (the common alpha-propylene glycol or propanediol-1,2), butanediol-1,3, diethylene glycol, triethylene glycol, ethylene glycol and the like.

The polymeric compounds or polyesters of this invention may be unterminated or, if desired, these compounds may be terminated. In the instance where the polymeric compounds or polyesters prepared in accordance with this invention are terminated the polyesters are terminated by means of a monohydric alcohol containing an either group or groups. Suitable chain terminating ether alcohols, monohydric ether alcohols, which may be employed in the preparation of terminated polyesters of this invention include such compounds as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether and the like.

The novel polymeric compounds or polyesters prepared in accordance with this invention, particularly when employed as plasticizers associated with a synthetic resin, such as polyvinyl acetate resins, or a mixture of synthetic resins, have a molecular weight in the range from about 400, e.g., 450, to about 4000, e.g., 3700. Desirably, the unterminated polyesters of this invention have a molecular weight from about 1000 to about 3700 whereas the terminated polyesters prepared in accordance with this invention (terminated by alkoxy groups) have a molecular weight in the range from about 450 to about 1700.

The unterminated polyesters prepared in accordance with the practice of this invention may be represented by the general formula:

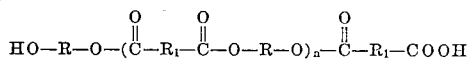

wherein R is an alkylene radical which may consist of saturated aliphatic hydrocarbon groups, straight or branched chain, containing from 2 to 4 carbon atoms each or a polyoxyethylene radical of the formula:

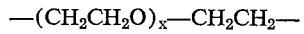

wherein $x$ may be 1 or 2, and wherein $R_1$ in the general formula represents an alkylene radical and may be an aliphatic hydrocarbon radical containing from 4 to 8 carbon atoms or $R_1$ may be derived from ether-containing dibasic acid, in which case $R_1$ would have the formula:

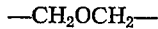

$R_1$ when derived from the dibasic acid portion of the polyester may be composed of ether of the types of dibasic acids mentioned hereinabove or a combination of the two types of dibasic acids may be used. In the above formula $n$ is an integer having a value in the range 5–10, inclusive.

The terminated polymeric compounds or the terminated polyesters prepared in accordance with this invention may be represented by the general formula:

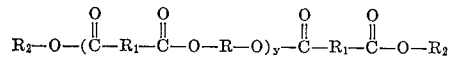

wherein R represents an alkylene radical and may consist of a saturated hydrocarbon group, straight or branched chain, containing from 2 to 4 carbon atoms or a polyoxyethylene radical having the formula:

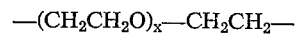

wherein $x$ may be an integer having the value 1 or 2, $R_1$ in this formula may be deirved from the dibasic acid portion of the polyester and is from an ether containing dibasic acid with the result that $R_1$ has the formula:

also $R_1$ may be derived from a dibasic acid of the aforementioned aliphatic type or ether-containing type of mixtures of each and/or both, $R_2$ is derived from an ether of ethylene glycol or diethylene glycol and has the formula:

wherein $R_3$ may be an aliphatic hydrocarbon radical containing from 1 to 4 carbon atoms and $y$ is an integer having a value in the range from 1 to 5 inclusive.

In the preparation of the novel polyesters of this invention the diglycolic acid when used admixed with an aliphatic dicarboxylic acid of the type described hereinabove comprises a substantial portion of the resulting mixture of aliphatic dicarboxylic acids. It is preferred that diglycolic acid, when admixed with another aliphatic dicarboxylic acid, comprises at least about 20% by weight, such as about 30–70% by weight, of the mixture of dicarboxylic acids. It is preferred that when an aliphatic dicarboxylic acid is admixed with diglycolic acid in the preparation of the polyesters of this invention that adipic acid be employed, such as an amount of adipic acid equal in weight to the ether linkage aliphatic dicarboxylic acid admixed therewith, viz, diglycolic acid.

In the preparation of the novel linear polyesters of this invention, it is preferred that the dicarboxylic acids be esterified with glycols such as propylene glycol and diethylene glycols, since polyesters prepared from these glycols exhibit optimum properties as plasticizers for polyvinyl ester resin adhesive compositions.

When the novel polyester compounds prepared in accordance with this invention are terminated by means of a monohydric alcohol containing an ether group, it is preferred that the following ether type monohydric alcohols be employed, ethylene glycol monobutyl ether and diethylene glycol monobutyl ether or mixtures thereof.

The novel polyesters of this invention are prepared by esterifying the dicarboxylic acid or dicarboxylic acid mixture employed by refluxing with glycol or an admixture of glycol and a monohydric ether containing alcohol with the removal of water as formed during the esterification operation. Water removal during the esterification operation may be aided by means of an entraining agent, such as benzene or toluene or the like.

As indicated by the above formulas, the unterminated polyester may be prepared by reacting a weight of the glycol equivalent to the combined equivalent weights of the dibasic acids employed, plus an excess of the glycol of 5 to 10 percent by weight of stoichiometric excess to increase the rate of esterification. Upon completion of the reaction, the excess glycol is removed such as by distillation.

In practice, equal weights of the dibasic acid containing the ether group and the alkylene dibasic acid are usually employed. The total equivalent weights for the dibasic acid portion of the polyester can be readily calculated. An amount of the selected glycol at least equivalent to the total equivalent weights of the dibasic acids is used to form the polyester and, as indicated hereinabove, plus an excess of 5 to 10 percent of the selected glycol or mixture of glycols to aid the esterification reaction. The molecular weight of the resulting unterminated polyester may be varied by varying the time of reaction, the reaction temperature and the vacuum applied during the reaction.

As indicated by the general formula for the terminated polyesters, these terminated polyesters may be prepared by reacting two mols of the dibasic acid or dibasic acid mixture with one mol of the glycol and two mols of the terminating alcohol, desirably together with a stoichiometric excess of the glycol and the alcohol in the range of about 10–30 percent each. The chain length of the terminated polyester, and accordingly the molecular weight, may be increased by increasing the quantities of glycol and dibasic acid in equivalent amounts while keeping the amount of the terminating monohydric alcohol constant. This amounts to increasing the value of $y$ in the general formula of the terminated polyesters. For example, if four equivalents of the dibasic acid, two equivalents of the glycol and two equivalents of the monohydric alcohol are reacted, theoretically the value of $y$ in the terminated polyester formula would be 1. In a like manner, if six equivalents of the dibasic acid, four equivalents of the glycol and two equivalents of the monohydric alcohol are completely reacted with the theoretical amount of water collected during the reaction, $y$ would have a value of 2. Another method of representing the increase in chain length and molecular weight of the terminated polyester is by allowing $y$ to equal $$2\left(\frac{\text{number of mols of glycol}}{\text{number of mols of terminating alcohol}}\right)$$

The dibasic acid used would be equal to the sum of equivalents of the glycol and the alcohol. In the first example above, two equivalents or one mol of glycol and two equivalents or two mols of the alcohol are employed so that $y$ would be $2 \times \frac{1}{2}$ or 1. In the first example, four equivalents or two mols of the dibasic acid would be used. In the second example above, four equivalents or two mols of glycol and two equivalents or two mols of the alcohol were suggested so that $y$ would be $2 \times \frac{2}{2}$ or 2. In the second example, six equivalents or three mols of the dibasic acid would be used. As indicated hereinbefore, an excess of both the glycol and the alcohol of 10 to 30 percent is desirable to speed the reaction.

Upon evaluation of the polyesters prepared in accordance with this invention for compatibility and as plasticizers in synthetic resins, for example, polyvinyl acetate resin, the polarity of the polyester molecule was found to be a contributing factor to the effectiveness of the polyester. The polarity of the polyesters of this invention can be increased by using short hydrocarbon chains with more ester linkages and therefore a higher oxygen content. The use of an ether-containing dibasic acid with ether-containing glycols and, if desired, termination by an ether-containing alcohol contribute in a more pronounced manner to the polarity of the resulting polyester molecule and therefore to the special properties and effects obtained by the use of these polyesters when employed as plasticizers, particularly with polyvinyl acetate resins. It has been shown that good compatibility and adhesive properties have been obtained with polyvinyl acetate resins using polyesters having an ether oxygen content of 4 percent by weight based on the polyester molecule. Most of the polyesters prepared in accordance with this invention have an ether oxygen content of 10 to 14 percent and other polyesters have exhibited good properties with an ether oxygen content of 18 percent by weight. The total oxygen content of these polyesters ranges from 20 percent to as high as 53 percent by weight. While the properties of these polyesters are not totally dependent on the total oxygen content or the percent of either oxygen content it has been found that polyesters with a total oxygen content of 30 to 50 percent and an ether oxygen content from 4 to 19 percent by weight exhibit the best compatibility in polyvinyl acetate resins and contribute the best properties to polyvinyl resin adhesive compositions. In using these polyesters as plasticizers with polyvinyl acetate, it has been found the polyesters may be incorporated in or admixed with the resin in amounts from 10 to 50 percent of the resin, more or less, although more common practice dictates the use of from 10 to 40 percent polyester in such resin composition.

The following examples are illustrative of practices of this invention.

*Example No. 1*

A 2-liter three-neck flask was charged with 438 grams of adipic acid (3 mols), 438 grams of diglycolic acid (3.27 mols) and 698 grams of diethylene glycol (6.27 mols plus 5 percent excess). The three-neck flask was equipped with a stirrer, a thermometer and a gas inlet tube (reaction was run under a $CO_2$ gas blanket). A short air condenser on top of which was a water separator (Dean-Stark) and a water condenser were also employed with the flask. The thermometer and gas inlet tube were inserted by using an adapter with a parallel side arm. The flask was placed in an electric heating mantle which served as a source of heat for the reaction. The water formed during the esterification reaction was drawn off and collected in a graduated cylinder.

Heat was applied to the reaction mixture in the flask and the temperature of the reaction was raised as fast as possible to about 180° C. This required about six hours during which about 183 cc. of water were removed and collected and the acid value of the reaction mixture was reduced to about 75–85. The reaction mixture was then placed under vacuum of about 200 mm. Hg absolute and was gradually reduced to 20–30 mm. Hg absolute as water was continuously removed. After about six hours at a maximum temperature of 214° C. the acid value of the reaction mixture was between 15–24. The resulting product was then cooled and filtered. These were obtained 1305 grams of the product polyester (99 percent of theory) having the following analytical values:

| | |
|---|---|
| Acid value | 16.5 |
| Saponification value | 518.5 |
| Hydroxyl value | 39.4 |
| Molecular weight | 2280 |

The molecular weight of this polyester and the polyesters prepared in the subsequent examples was determined by the boiling-point elevation method.

The product polyester was evaluated for performance in the following tests:

A. *Compatibility*.—The compatibility of the polyester prepared above was examined in two polyvinyl acetate homopolymer resins of low and medium molecular weight and intrinsic viscosity at a 9/1, 3/1 and 1/1 parts by weight resin to plasticizer level. All systems were clear, showing complete compatibility. The polyester was also found to be compatible with cellulose acetate at a 1/1 level and with cellulose acetate butyrate at a level of resin to plasticizer of 3/1.

B. *Speed of adhesion—set tack*.—A four mil was drawn down on a two inch piece of non-porous paper from a mixture containing 20 parts of the polyester and 100 parts of a polyvinyl acetate homopolymer emulsion in which the predominant particle size of the resin component was 1 to 3 microns, the polyvinyl acetate monomer content was at most 1 percent and the total solids content was at least 55 percent. As soon as the film was drawn down, a similar piece of paper one inch wide was smoothed onto the adhesive layer of resin and polyester. The latter piece of paper was then continually pulled back slowly at a 180° angle and the time noted in seconds from the start of the separation until a fiber tear was produced. In this test, using the polyester prepared above, the set tack was 95–100 seconds, a most acceptable value.

C. *Viscosity stability*.—The Brookfield viscosity was measured at different intervals on a mixture of 20 parts of the prepared polyester and 100 parts of an emulsion of polyvinyl acetate homopolymer containing 55 percent solids described above, using spindle No. 4 at 10 r.p.m. and at 77° F. The following test values were obtained:

| Time interval: | Viscosity, cps. |
|---|---|
| 1 hour | 6,900 |
| 1 day | 6,900 |
| 3 days | 7,100 |
| 7 days | 7,600 |

These test values show the viscosity of the plasticizer-resin emulsion does not increase too rapidly for use.

D. *Specific adhesion.*—The specific adhesion imparted by the polyester to the polyvinyl ester film was evaluated by drawing down a 4 mil film on a 100 percent cotton fiber Strathmore Bond paper, followed by immediately rolling on the substrate to be tested. The film was again drawn down from a mixture containing 20 parts of the polyester and 100 parts of an emulsion of polyvinyl acetate homopolymer containing 55 percent total solids as described herein. The films were allowed to dry overnight. The specific adhesion was tested by pulling back the paper at a 180° C. angle to measure the adhesion. The prepared polyester was found to exhibit good adhesion to glass, cellulose acetate and cellophane.

E. *Migration.*—The migration tendency of the polyester was tested by drawing down a 15 mil film from a mixture of 20 parts of the polyester and 100 parts of an emulsion of polyvinyl acetate homopolymer containing 55 percent total solids onto white bleached sulfite paper. Sheets of cellophane and polyethylene were rolled onto separate portions of the emulsion layer. These were dried at 25° C. The strips were then placed in an oven at 275° F. after which they were examined at 3 hour, 6 hour and 24 hour periods. No staining or soaking through was observed indicating a lack of migration.

Example No. 2

A 2-liter three-neck flask was charged with 450 grams of diglycolic acid (3.36 mols), 450 grams of adipic acid (3.08 mols) and 514 grams of propylene glycol (6.44 mols, plus 5 percent excess). The reaction was carried out as described in Example No. 1. A yield of 1146 grams of the product polyester was obtained (99.2 percent of theory) having the following analytical values:

Acid value _____ 23.3
Saponification value _____ 611.4
Molecular weight _____ 1500

The product polyester was evaluated for performance in the following tests:

A. *Compatibility.*—The prepared polyester was found to be compatible with polyvinyl acetate and cellulose acetate at levels as high as 1/1 and to be compatible with cellulose acetate butyrate at a resin to plasticizer level of 3/1.

B. *Speed of adhesion—set tack.*—The polyester was tested according to the procedure described in Example No. 1 and found to have an excellent set tack time of 65–70 seconds.

C. *Viscosity stability.*—The Brookfield viscosity was measured at different intervals on a mixture of 20 parts of the prepared polyester and 100 parts of an emulsion of polyvinyl acetate homopolymer containing 55 percent solids as described in Example No. 1. The viscosity was measured using spindle No. 4 at 10 r.p.m. with the following values obtained at 77° F.

| Time interval: | Viscosity, cps. |
|---|---|
| 1 hour | 3,400 |
| 1 day | 2,900 |
| 3 days | 3,260 |
| 7 days | 3,500 |

The test values showed the viscosity of the plasticizer-resin emulsion does not increase too rapidly for use.

D. *Specific adhesion.*—The specific adhesion imported by the product polyester was tested as in Example No. 1. The resin showed good adhesion to glass, cellulose acetate and cellophane.

E. *Migration.*—The migrating tendencies of the polyester were tested as described in Example No. 1 revealing little staining or soaking through, indicative of a lack of migration.

Example No. 3

A 2-liter three-neck flask was charged 603 grams of diglycolic acid (4.5 mols), 274 grams of propylene glycol (3 mols plus 20 percent excess), 425 grams of ethylene gylcol monobutyl ether or butyl Cellosolve (3 moles plus 20 percent excess) along with 200 cc. of benzene. The reaction mixture was heated and the benzene was allowed to flow back into the reaction mixture while the entrained water was removed from the bottom of the Dean-Stark trap, as in the apparatus described in Example No. 1. During the first six hours, the reaction temperature was allowed to reach 106° C. During the next six hours, some benzene was removed and the temperature was gradually raised to 170° C. The acid value of the polyester at this point was in the range 50–60. During the next eight hour period, more benzene was removed and the reaction temperature was raised to 185° C. The acid value of the polyester at this point was about 25.

The system was then put under vacuum at 200 mm. Hg absolute and gradually reduced over eight hours to about 20–30 mm., with the reaction temperature held below 210° C. During this last period, all the benzene was removed as well as the excess butyl Cellosolve. The acid value of the polyester at this point was 4.5. The reaction mixture was then stripped under vacuum (3–5 mm. Hg absolute) for about three or four hours or until all monomer and excess glycol were removed as the temperature went as high as 215° C. When no more material was removed, the reaction mixture was cooled and filtered. There was obtained a product polyester at a yield of 922 grams (90.5 percent of theory) having the following analytical values:

Acid value _____ 1.2
Saponification value _____ 525.3
Molecular weight _____ 855

Evaluation of this polyester revealed it possessed excelent compatibility with polyvinyl acetate and cellulose acetate at plasticizer to resin levels of 1/9, 1/3 and 1/1 and good compatibility with cellulose acetate butyrate at a 1/3 level. The speed of adhesion or set tack was determined as described in Example No. 1 and found to be 70–75 seconds, indicative of advantageous adhesive properties. Brookfield viscosity measurements taken at different time intervals on a mixture of 20 parts of the polyester and 100 parts of an emulsion of polyvinyl acetate homopolymer containing 55 percent solids, as described in Example No. 1, using spindle No. 4 at 10 r.p.m. and 77° F. resulted in the following test results:

| Time interval: | Viscosity, cps. |
|---|---|
| 1 hour | 4,700 |
| 1 day | 4,620 |
| 3 days | 5,040 |
| 7 days | 5,280 |

Again, excellent viscosity stability of plasticized emulsion was exhibited.

Specific adhesion was evaluated by tests similar to those described in Example No. 1 and showed that the product polyester in polyvinyl acetate possessed good adhesion to glass, cellulose acetate and cellophane. The product polyester was also found to have good non-migratory properties.

Example No. 4

A 2-liter, three-neck flask was charged with 503 grams of diglycolic acid (3.75 mols), 318 grams of diethylene glycol (2.5 mols plus 20 percent excess), 354 grams of ethylene glycol monobutyl ether (2.5 mols plus 20 percent excess) and 200 cc. of benzene. The esterification apparatus was similar to that described in Example No. 1, and the reaction was run according to the procedure described in Example No. 3. From this reaction there were obtained 746 grams of the terminated polyester (80.3 percent of theory) having the following analytical values:

Acid value _____ 1.3
Saponification value _____ 500.6
Molecular weight _____ 1415

The polyester was found to be compatible with a polyvinyl acetate homopolymer resin at 1/1 level, giving excellent clarity and good tackiness or adhesive properties.

*Example No. 5*

A 2-liter, three-neck flask was charged with 536 grams of diglycolic acid (4 mols), 255 grams of diethylene glycol (2 mols plus 20 percent excess), 778 grams of diethylene glycol monobutyl ether or butyl Carbitol (4 mols plus 20 percent excess) along with 200 cc. of xylene. The esterification apparatus was similar to that described in Example No. 1 and the reaction was carried out according to the procedure described in Example No. 3. There was obtained as product 1011 grams of the terminated polyester (81 percent of theory) which had the following analytical values:

Acid value _____ 1.2
Saponification value _____ 402
Molecular weight _____ 705

This polyester, when tested with a polyvinyl acetate homopolylmer was found to have good compatibility as indicated by excellent clarity of film as well as good tackiness or adhesive tendencies.

As will be apparent to those skilled in the art in the light of the foregoing disclosure many modifications, alterations and substitutions are possible in the practice of this invention without departing from the spirit or scope thereof.

What is claimed is:

1. A composition of matter comprising polyvinyl acetate and as a plasticizer for said polyvinyl acetate a polyester in an amount from about 10 to about 60% by weight based on said polyvinyl acetate prepared by the esterification reaction of a mixture consisting essentially of diglycolic acid, propylene glycol and an alcohol selected from the group consisting of ether alcohols having the formula $R_1$—$OC_2H_4OH$ and ether alcohols having the formula $R_1$—$OC_2H_4OC_2H_4OH$ wherein $R_1$ is an aliphatic hydrocarbon radical containing from 1 to 4 carbon atoms, said polyester having the structural formula

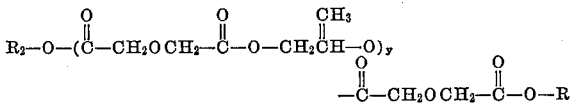

wherein $R_2$ is radical selected from the group consisting of the radical $R_1$—$OC_2H_4$— and the radical

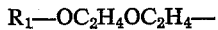

wherein $R_1$ is as aforesaid and wherein $y$ has an average value for the polyester molecules having the above structural formula in said composition to give an average molecular weight in the range 450–1700.

2. A composition of matter in accordance with claim 1 wherein said alcohol is ethylene glycol monobutyl ether.

References Cited by the Examiner

UNITED STATES PATENTS

| | | | |
|---|---|---|---|
| Re. 24,287 | 3/57 | Smith | 260—484 |
| 1,714,173 | 5/29 | Kessler et al. | 260—75 |
| 2,034,297 | 3/36 | Heyse et al. | 260—31.4 |
| 2,160,372 | 5/39 | Stark | 260—31.4 |
| 2,562,878 | 8/51 | Blair | 260—5 |
| 2,599,538 | 6/52 | Blair | 252—340 |
| 2,689,799 | 9/54 | Albus et al. | 106—182 |
| 3,015,571 | 1/62 | Bowman et al. | 260—31.4 |

JOSEPH L. SCHOFER, *Primary Examiner.*

LEON J. BERCOVITZ, JAMES A. SEIDLECK,
*Examiners.*

UNITED STATES PATENT OFFICE
CERTIFICATE OF CORRECTION

Patent No. 3,211,688                        October 12, 1965

Wilmer C. Eisenhard et al.

It is hereby certified that error appears in the above numbered patent requiring correction and that the said Letters Patent should read as corrected below.

Column 3, line 47, for "analkylene" read -- an alkylene --; line 54, for "ether" read -- either --; line 72, for "deirved" read -- derived --; column 5, line 58, for "either" read -- ether --; column 6, line 24, for "These" read -- There --; line 46, after "mil" insert -- film --; column 9, line 21, for "homopolylmer" read -- homopolymer --; column 10, lines 6 to 10, the structural formula should appear as shown below instead of as in the patent:

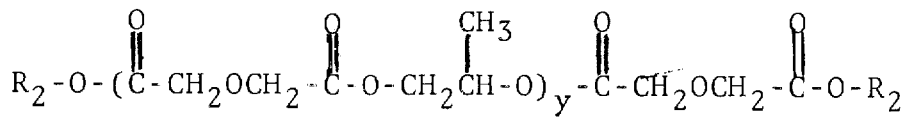

Signed and sealed this 28th day of June 1966.

(SEAL)
Attest:

ERNEST W. SWIDER                        EDWARD J. BRENNER
Attesting Officer                   Commissioner of Patents